US009588263B2

(12) United States Patent
Gollier et al.

(10) Patent No.: US 9,588,263 B2
(45) Date of Patent: Mar. 7, 2017

(54) DISPLAY ELEMENT HAVING BURIED SCATTERING ANTI-GLARE LAYER

(71) Applicant: CORNING INCORPORATED, Corning, NY (US)

(72) Inventors: Jacques Gollier, Painted Post, NY (US); Shandon Dee Hart, Corning, NY (US); Ellen Marie Kosik Williams, Painted Post, NY (US); Dmitri Vladislavovich Kuksenkov, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 272 days.

(21) Appl. No.: 13/956,792

(22) Filed: Aug. 1, 2013

(65) Prior Publication Data

US 2014/0049822 A1    Feb. 20, 2014

Related U.S. Application Data

(60) Provisional application No. 61/684,226, filed on Aug. 17, 2012.

(51) Int. Cl.
*G02B 5/02* (2006.01)
*G02F 1/1335* (2006.01)

(52) U.S. Cl.
CPC .......... *G02B 5/0205* (2013.01); *G02B 5/021* (2013.01); *G02B 5/0226* (2013.01);
(Continued)

(58) Field of Classification Search
CPC ........ G02B 5/02; G02B 5/0205; G02B 5/021; G02B 5/0226; G02B 5/0236; G02B 5/0278;
(Continued)

(56) References Cited

U.S. PATENT DOCUMENTS 6,697,515 B2    2/2004 Furui
7,751,121 B2    7/2010 Nagahama et al.
(Continued)

FOREIGN PATENT DOCUMENTS

EP    2618183    7/2013
JP    04484177    1/2000
JP    04888392    2/2012
JP    04896368    3/2012
(Continued)

OTHER PUBLICATIONS

Ching-His, Lin, Chen-Hsun Du, Chung Wen Lan: "Fast nano-scale texturing using the self-assembly polymer mask and wet chemical etching," Conference Record of the IEEE Photovoltaic Specialists Conference, 2009, 34th IEEE Photovoltaic Specialists Conference, PVSC 2009, p. 1-5.

(Continued)

*Primary Examiner* — Bumsuk Won
*Assistant Examiner* — Ephrem Mebrahtu
(74) *Attorney, Agent, or Firm* — Jie Gao

(57) ABSTRACT

A display element for viewing a display such as, for example, a display on an electronic device. The display element comprises a transparent substrate and a scattering anti-glare layer located between a front surface and back surface of the display element, wherein the scattering anti-glare layer comprises a plurality of scattering elements. The scattering anti-glare layer has low reflectivity and provides an anti-glare effect for light reflected by interfaces within the display element.

33 Claims, 6 Drawing Sheets

(52) U.S. Cl.
CPC ......... *G02B 5/0236* (2013.01); *G02B 5/0278* (2013.01); *G02B 5/0294* (2013.01); *G02F 1/133502* (2013.01); *G02F 2201/38* (2013.01)

(58) Field of Classification Search
CPC ............. G02B 5/0294; G02F 1/133502; G02F 2201/38
USPC ..... 359/599, 601, 567, 488.01; 349/96, 112, 349/137
See application file for complete search history.

(56) References Cited

U.S. PATENT DOCUMENTS

| | | | |
|---|---|---|---|
| 8,182,899 | B2 | 5/2012 | Nagahama et al. |
| 2001/0035929 | A1 | 11/2001 | Nakamura et al. |
| 2004/0195201 | A1 | 10/2004 | Chao et al. |
| 2004/0240070 | A1 | 12/2004 | Suzuki et al. |
| 2008/0057228 | A1 | 3/2008 | Horie et al. |
| 2008/0142477 | A1 | 6/2008 | Jacobs |
| 2008/0206458 | A1* | 8/2008 | Watanabe et al. ......... 427/163.4 |
| 2009/0015926 | A1 | 1/2009 | Iwata et al. |
| 2009/0071537 | A1 | 3/2009 | Yavuzcetin et al. |
| 2010/0039708 | A1 | 2/2010 | Suzuki et al. |
| 2010/0238384 | A1 | 9/2010 | Tochigi et al. |
| 2010/0246016 | A1 | 9/2010 | Carlson et al. |
| 2010/0285275 | A1 | 11/2010 | Baca et al. |
| 2011/0062849 | A1 | 3/2011 | Carlson et al. |
| 2011/0267697 | A1 | 11/2011 | Kohli et al. |
| 2011/0267698 | A1 | 11/2011 | Guilfoyle et al. |
| 2012/0019900 | A1* | 1/2012 | Kitson et al. ................. 359/296 |
| 2012/0134024 | A1 | 5/2012 | Lander et al. |
| 2012/0218640 | A1 | 8/2012 | Gollier |
| 2012/0221264 | A1 | 8/2012 | Gollier |
| 2012/0300304 | A1 | 11/2012 | Gollier |

FOREIGN PATENT DOCUMENTS

| | | |
|---|---|---|
| KR | 872621 | 2/2000 |
| WO | 0202472 | 1/2002 |
| WO | 2011/052652 | 5/2011 |
| WO | 2011137141 | 11/2011 |
| WO | 2011137144 | 11/2011 |
| WO | 2012/036270 | 3/2012 |
| WO | 2012036270 | 3/2012 |

OTHER PUBLICATIONS

Fiske et al, "Visual quality of high contrast projection screens. Part 1: Visibility of screen-based artifacts and noise," Journal of the SID 15/6, 2007, p. 409-419.
Huckaby et al, "Quantifying "Sparkle" of Anti-Glare Surfaces", SID 09 Digest, p. 511-513.
Patent Cooperation Treaty International Notification of Transmittal of the International Search Report and The Written Opinion of the International Searching Authority, international application No. PCT/US2013/053737; mailing date Nov. 12, 2013, 15 pages.
U.S. Appl. No. 61/447,285, filed Feb. 28, 2011, Gollier, et al.
U.S. Appl. No. 61/329,936, filed Apr. 30, 2010, Guilfoyle, et al.
U.S. Appl. No. 61/372,655, filed Aug. 11, 2010, Guilfoyle, et al.
U.S. Appl. No. 61/329,951, filed Apr. 30, 2010, Kohli, et al.
U.S. Appl. No. 61/417,674, filed Nov. 29, 2010, Lander, et al.
Patent Cooperation Treaty International Notification of Transmittal of the International Preliminary Report of Patentability Report on Patentability (Chapter I of the Patent Cooperation Treaty) of the International Searching Authority, international application No. PCT/US2013/053737: mailing date Feb. 26, 2015, 12 pages.

* cited by examiner

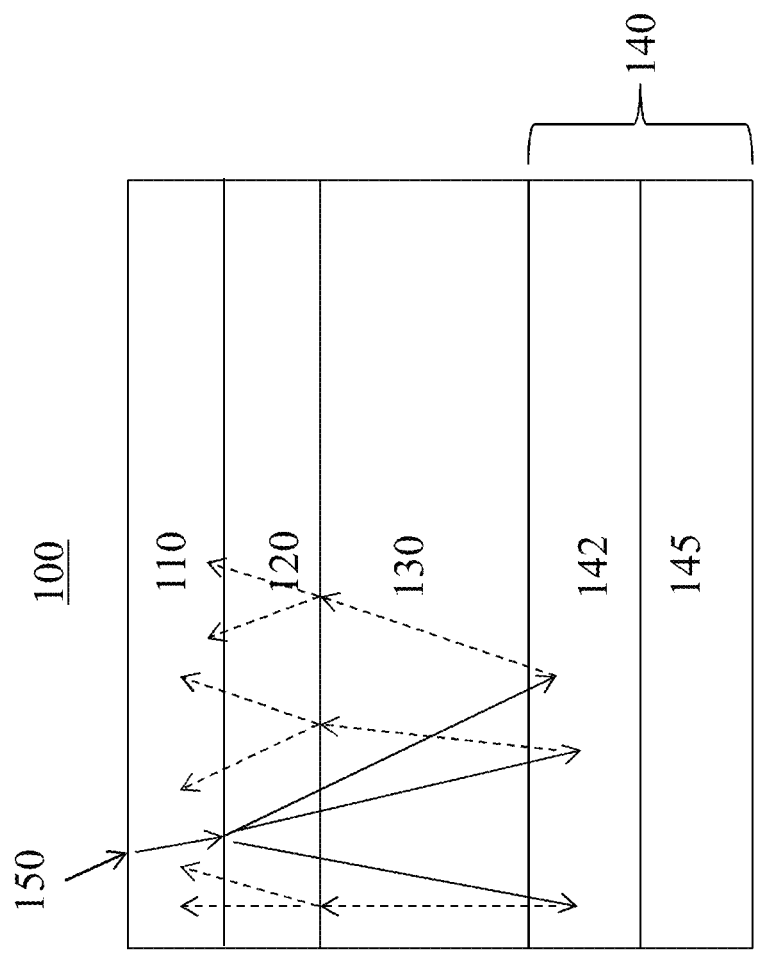

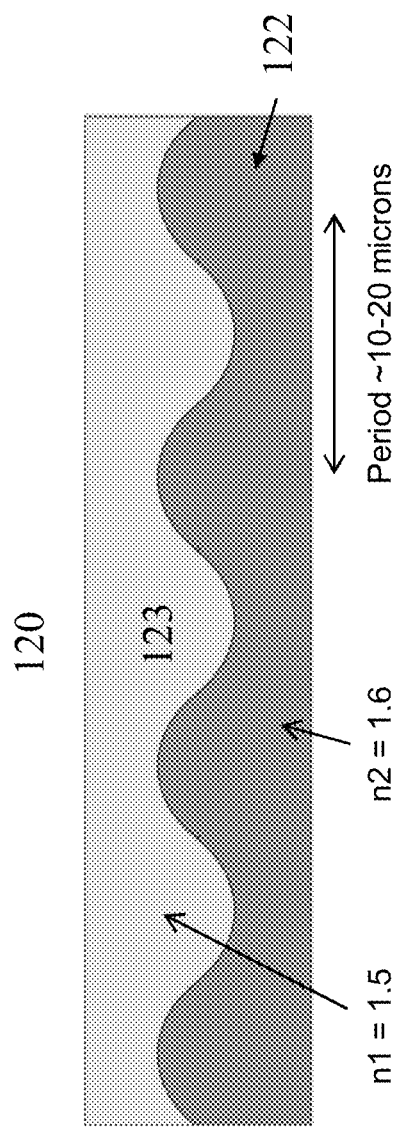

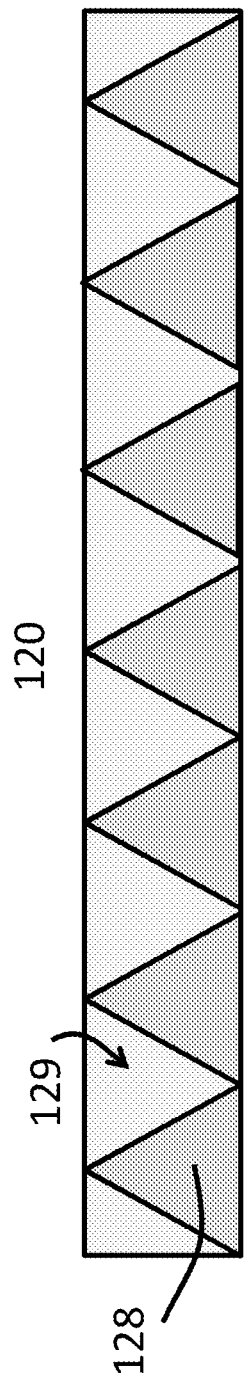

DISPLAY ELEMENT HAVING BURIED SCATTERING ANTI-GLARE LAYER

This application claims the benefit of priority under 35 U.S.C. §119 of U.S. Provisional Application Ser. No. 61/684,226 filed on Aug. 17, 2012 the content of which is relied upon and incorporated herein by reference in its entirety.

BACKGROUND

The disclosure relates to a display window or element for viewing. More particularly, the disclosure relates to a glass display element having anti-glare properties.

The reflection of ambient light, commonly referred to as "glare," poses a problem for displays in consumer electronic devices. In such applications, glare reduces the apparent contrast and readability of the display.

Anti-glare (AG) treatments in the form of rough surfaces typically in contact with air, by themselves or in combination with anti-reflective (AR) treatments in the form of coatings with reduced reflectivity, are common on displays having a plastic cover. As the use of strong, damage resistant glasses has become more widespread in such devices, however, the inclusion of AG and/or AR treatments becomes more problematic. It is more difficult to provide a glass surface with the degree of roughness needed to achieve AG properties, and anti-reflective coatings or films alone may not adequately reduce glare. One reason is that reflection in a glass cover device is not only produced by the exterior surfaces of the cover glass, but also by other interfaces within the display "stack," such as surfaces of liquid crystal layers, transparent conductors, polarizers, color filters, etc.

Removing all of the internal reflections, which can create a total (i.e., diffuse and specular) reflectance of 4-15%, may be difficult. While multiple layers are present in a display, working only with the front surface of the cover glass and reducing its reflectance from, for example, 4% to below 1% creates only a partial benefit to the user. AG can be combined with AR on the front surface, for example by etching a certain surface roughness pattern into the glass and uniformly coating it with a single or multiple AR layers by magnetron sputtering. While such treatment works well in reflection, it will generally not perform as well for transmitted light reflected by interfaces below, unless the AG scattering is so great that it also degrades the visibility of the display. Generally, when average surface roughness height is large enough to create substantial anti-glare effects, then the average lateral size of the roughness features is necessarily relatively large to produce narrow-angle scattering in transmission and also wash out the images reflected by surfaces below. Such features will also produce a significant level of "sparkle" (cross-talk between adjacent image pixels). On the other hand, if the average lateral size of the roughness features is sufficiently small to minimize sparkle, the resulting scattering will be over a wider range of angles, generating "haze," which reduces the contrast ratio of the display under ambient lighting.

SUMMARY

The present disclosure meets these and other needs by providing a display element for viewing a display such as, for example, use in or on an electronic device. The display element comprises a transparent substrate and a scattering anti-glare layer comprising a plurality of scattering elements located between a front surface and back surface of the display element. The scattering anti-glare layer has low reflectivity and provides an anti-glare effect for light reflected by interfaces within the display element.

Accordingly, one aspect of the disclosure is to provide a display element comprising a front surface, a back surface, a scattering anti-glare layer disposed between the front surface and the back surface, wherein the scattering anti-glare layer is transparent and comprises a plurality of scattering elements, and a transparent substrate disposed between the front surface and the back surface.

Another aspect is to provide a buried scattering anti-glare layer for a display element. The buried scattering anti-glare layer is transparent and capable of being disposed between a front surface and a back surface of the display element, and comprises a plurality of scattering elements having an average lateral dimension of less than about 50 µm. The buried scattering anti-glare layer has less than about 2% total reflectance. Less than 5% of light transmitted through the buried scattering anti-glare layer is scattered outside of about 5 degrees from an angle of incidence of the transmitted light.

Yet another aspect of the disclosure is to provide a display element comprising: a front surface comprising an antiglare surface, an antireflective surface, or a combination thereof; a back surface; a scattering anti-glare layer disposed between the front surface and the back surface; and a transparent substrate disposed between the front surface and the back surface. The scattering layer is transparent and comprises a plurality of scattering elements having an average lateral dimension of less than about 50 µm. The buried scattering anti-glare layer has less than about 2% total reflectance, and less than 5% of light transmitted through the buried scattering anti-glare layer is scattered outside of about 5 degrees from an angle of incidence of the transmitted light.

These and other aspects, advantages, and salient features will become apparent from the following detailed description, the accompanying drawings, and the appended claims.

BRIEF DESCRIPTION OF THE DRAWINGS

FIG. 1 is a schematic cross-sectional view of a display element;

FIG. 2a is s schematic cross-sectional view of a scattering anti-glare layer comprising a roughened or undulating surface layer embedded in a matrix material;

FIG. 2d is a schematic cross-sectional view of a scattering anti-glare layer comprising a plurality of particles embedded in a matrix material and having a prismatic structure;

DETAILED DESCRIPTION

Figure 2B:
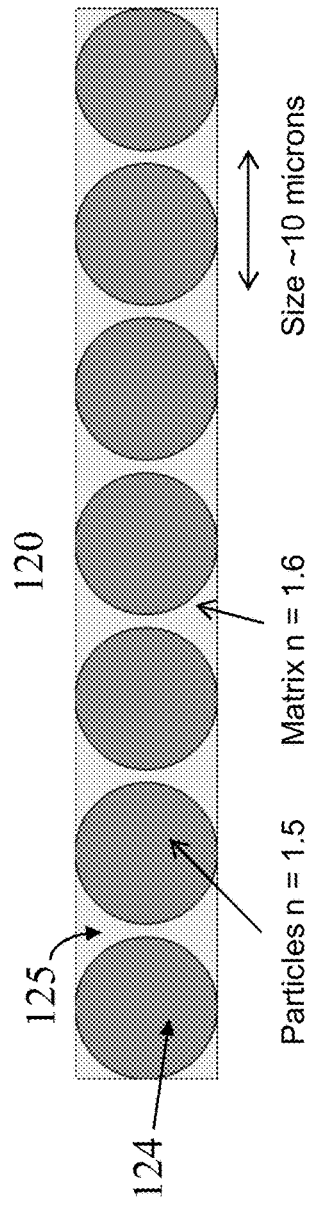
FIG. 2b is a schematic cross-sectional view of a scattering anti-glare layer comprising a plurality of particles embedded in a matrix material.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described, as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, the term "RMS roughness" refers to the root mean square average measured height deviation taken or measured within an evaluation length or area and measured from the mean linear surface.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glare, or reflection of ambient light, always was and remains a serious problem for consumer electronics devices with displays because it reduces apparent contrast and readability. Anti-glare (AG) treatments in the form of rough surfaces typically in contact with air, by themselves or in combination with anti-reflective (AR) treatments in the form of coatings with reduced reflectivity, are common on displays having a plastic cover or viewing window. Recently, glass—particularly chemically strengthened glass—has become a popular choice for such devices, especially for handheld devices. However, a majority of these handheld devices are offered without either AG or AR treatment. Surface roughness is not easily imprinted on chemically strengthened glass, and coated scattering layers may decrease the scratch resistance and/or strength of the glass. Single and multi-layer antireflective treatments are relatively easy to apply to the glass surface using magnetron sputtering or sol-gel technologies. However, AR coatings alone do not necessarily eliminate the problem of glare. One reason for this is that the reflection observed in a glass cover device is produced not only by one or both of the cover glass surfaces, but also by other interfaces within the display stack layers and touch-sensing layers. Such layers may include surfaces of or interfaces between glass, liquid crystal layers, transparent conductors (such as ITO), metal layers, black matrix materials, semiconductors, transistors, polarizers, color filters, or the like. The sum of all of these reflections may total 4-15% in magnitude. Working only with the front surface of the cover glass and reducing its reflectivity from, for example 4% to below 1%, creates only a partial benefit to the user. If the reflection from layers behind the cover glass (i.e., in buried or embedded layers within the display or touch-sensing structure) is difficult or expensive to eliminate, a plurality of relatively low-angle scattering elements may be added to the display element to wash out or diffuse the shapes of reflected objects, and thus improve display readability.

AG can be combined with AR on the front surface, for example, by etching a certain surface roughness pattern into the glass and uniformly coating it with a single or multiple AR layers. Such treatment, while working very well in reflection, will generally not perform as well for transmitted light and may distort the visibility of images emitted from the display. If the average surface roughness height is large enough to create substantial anti-glare effects, and the average lateral size of the roughness features is relatively large to create primarily narrow-angle scattering, a significant level of "sparkle" (cross-talk between adjacent image pixels) will be produced. If, however, the average lateral size of the roughness features is sufficiently small to eliminate sparkle, the resulting scattering will be into a wider range of angles, thus generating "haze" which reduces the contrast ratio of the display under ambient lighting (e.g., in such instances, black will appear as grey).

Described herein is a display element having relatively small reflectivity and reflective scattering. The display element provides sufficiently strong narrow angle scattering in transmission to produce an anti-glare effect for light reflected by interfaces within the display element or "stack" located below the front surface of the display element. The display element has a front surface and a back surface. Light is transmitted through the display element from a display located at or behind the back surface and exits the display element through the front surface. The display element also comprises a "buried" or sub-surface scattering anti-glare layer and a transparent substrate disposed between the front surface and the back surface.

A cross-sectional view of one embodiment of the display element 100 described herein is schematically shown in FIG. 1. A buried light scattering anti-glare layer (also referred to herein simply as the "buried scattering anti-glare layer") 120 is located or "buried" behind or below front surface 110 at a depth of at least about 0.01 micron (μm). The transparent substrate 130 is also located below or behind front surface 110. In some embodiments, the buried scattering anti-glare layer 120 is located between front surface 110 and transparent substrate 130. As shown in FIG. 1, the buried scattering anti-glare layer 120 is, in some embodiments, located immediately behind or adjacent to front surface 110 and in front of transparent substrate 130. In other embodiments (not shown), the buried scattering anti-glare layer 120 may be located behind transparent substrate 130 and in front of back surface 140. External ambient light 150 is either scattered or reflected by the various layers within display element 100. In some embodiments, less than about 5% of light transmitted through the display element 100 is scattered outside of 5° from the angle of incidence. In some embodiments, display element 100 has a thickness of up to about 3 mm.

In some embodiments, the display element 100 may further include one or more sub-surface layers, such as a display layer(s) 145 disposed on the back surface 140, and/or an adhesive layer(s) 142 disposed between one of the display layer(s) 145 and the transparent substrate 130 or disposed between one of the display layer(s) 145 and the scattering anti-glare layer 120. The display layer(s) 145 may include, but is not limited to, electronics layers, transistors, metallic layers, indium tin oxide (ITO) layers, image-forming layers, light-emitting layers, touch sensing layers, air-gap layers, and the like. The display layer(s) 145 may, in particular embodiments, include at least one of a touch sensing layer, a LCD display, a LED display, an OLED display, or combinations thereof. Image forming layers comprising the display may include, for example, a color filter plane in a LCD display or light-emitting layers in an OLED display. In some embodiments, the buried scattering anti-glare layer 120 and the image forming layer are separated by a distance of less than about 2 mm. The adhesive layer(s) 142, disposed between the display layer(s) 145 and the transparent substrate 130 or the scattering anti-glare layer 120, may be used to join display 145 to the remainder of display element 100. In some embodiments, the buried scattering anti-glare layer 120 is separated from the back surface 140 by a distance ranging from about 0.1 mm to about 2 mm.

In some embodiments, front surface 110 may comprise or include at least one of an antiglare layer, film or surface, an antireflective layer, film or surface, or any combination of antiglare and antireflective layers, films, and/or surfaces that are known in the art. In those embodiments in which the front surface 110 comprises an antiglare layer, film or a rough surface—which may additionally reduce or otherwise engineer the effective friction of the front surface of the display element, enhancing its utility in touch-screen applications—the buried scattering anti-glare layer 120 may serve an anti-sparkle function equally or more so than an anti-glare function. In such instances, it may be appropriate to describe the buried scattering anti-glare layer as being equivalent to a "buried scattering anti-sparkle layer." The buried scattering anti-sparkle layer is transparent and comprises a plurality of scattering components having an average lateral dimension of less than about 50 µm and may be disposed between the front surface 110 and back surface 140 of the display element 100. These scattering components in the buried scattering anti-sparkle layer may be referred to as having a high spatial frequency. The high spatial frequency scattering components of the buried scattering anti-sparkle layer may reduce the sparkle that is otherwise created by a surface roughness imparted to front surface 110. The rough front surface 110 may provide anti-glare and/or reduced or engineered effective friction for touch or stylus-based input.

In some embodiments, the buried scattering anti-glare layer 120 has a thickness of less than about 0.1 mm. The buried scattering anti-glare layer 120 is placed below the front exterior surface 110 of display element 100, but above or coincident with some internal reflecting interfaces within the display (such as electronics layers, transistors, metallic layers, ITO layers, image-forming layers, light-emitting layers, touch sensing layers, air-gap layers, and the like). In addition, an exterior surface of the display element 100 may include a reflection-reducing or glare-reducing treatment.

As mentioned hereinabove, the buried scattering anti-glare layer 120, in some embodiments, is designed to reduce or minimize "display sparkle" that can occur when scattering layers are placed over a pixelated display. Display sparkle is a distortion in the intensity of display pixels that is visible to the human eye. Display sparkle can be measured as a standard deviation of the total power detected from each pixel using a measurement system that mimics the properties of the human eye. U.S. patent application Ser. No. 13/405,787, by Jacques Gollier et al., entitled "Glass Having antiglare Surface with Low display Sparkle," filed Feb. 27, 2012, and claiming priority from U.S. Provisional Patent Application No. 61/447,242, filed on Feb. 28, 2011, and having the same name, teaches a roughened antiglare surface created by using chemical etching and/or mechanical (e.g., grinding, polishing, etc.) processes or the like. The resulting antiglare surface has a first RMS roughness Rlong of up to about 300 nm measured in a range of lateral spatial periods (sometimes referred to as surface wavelength) from about 80 µm to about 640 µm, a second RMS surface roughness Rshort measured at lateral spatial periods of less than about 20 µm, and a third RMS roughness Rtotal, measured without surface wavelength filtering, in a range from about 60 nm up to about 600 nm, wherein the ratio (Rlong/Rshort) is less than about 3.9. U.S. patent application Ser. No. 13/354,827, by Jacques Gollier et al., entitled "Apparatus and Method for Determining Sparkle," filed Jan. 20, 2012, and claiming priority from U.S. Provisional Patent Application No. 61/447,285, filed on Feb. 28, 2011, and having the same name, teaches a method and apparatus for measuring pixel power deviation (PPD), which is a measure of sparkle. The method comprises: acquiring an image of the transparent sample combined with a pixelated source, the image comprising a plurality of source pixels; determining boundaries between adjacent source pixels in the image; integrating within the boundaries to obtain an integrated total power for each of the plurality of source pixels in the image; and calculating a dispersion of the integrated total power per pixel, wherein the dispersion is the pixel power deviation. U.S. patent application Ser. No. 13/466,390, by Jacques Gollier et al., entitled "Transparent Glass Substrate Having Antiglare Surface," filed May 8, 2012, and claiming priority from U.S. Provisional Patent Application No. 61/490,678, filed on May 27, 2011, and having the same name, teaches a transparent glass substrate having an antiglare surface that minimizes sparkle and other forms of transmitted image degradation, and describes various anti-glare surface parameters and display combinations that minimize the negative effects on the transmitted image while retaining the beneficial anti-glare blurring of reflected images. The antiglare surface has a roughened portion that has a RMS amplitude of at least about 80 nm and may also include a portion that is unroughened or flat. The fraction of the antiglare surface that is roughened (the roughened portion) is at least about 0.9, and the fraction of the surface that is unroughened is less than about 0.10. The antiglare surface has a pixel power deviation of less than about 7%. The contents of the provisional and non-provisional U.S. patent applications described hereinabove are incorporated herein by reference in their entirety.

In one embodiment, the buried scattering anti-glare layer 120 reduces and/or minimizes sparkle, and has very low (or no) reflective scattering. In some embodiments, the buried scattering anti-glare layer has less than about 2% total (i.e., diffuse and specular) reflectance. At the same time, the buried scattering anti-glare layer 120 maintains significant forward scattering properties, where the forward scattering is primarily or entirely into narrow angles of deviation from the original light input angle.

By incorporating a buried scattering anti-glare layer that has low or no back-reflection or reflective scattering, and primarily narrow-angle forward-scattering, several desirable attributes may be simultaneously achieved. For example, internal reflections from sub-surface display layer(s) (e.g., ITO, electronics, and the like) 145 are made less visible, diffused, or are "blurred out," due to the forward-scattering properties of the buried scattering anti-glare layer 120. External ambient light 150 passes through the buried scattering anti-glare layer 120 before being reflected from the sub-surface display layer(s) 145 and passes through the buried scattering anti-glare layer 120 again after reflecting from the sub-surface display layer(s) 145. These two forward-scattering events serve to diffuse or "blur" the reflected image from these sub-surface display layers 145 that is seen by a viewer.

The lack of reflective back-scattering from the buried scattering anti-glare layer 120 serves two purposes. First, the total perceived reflectivity of the display is not increased by the buried scattering anti-glare layer. Second, the plurality of scattering elements in the buried scattering anti-glare layer 120 can be made small—in some embodiments, the mean lateral feature size is less than about 50 microns (μm) and, in other embodiments, less than about 15 μm, depending on display pixel size—without creating a "hazy" or "washed out" appearance of the display due to external ambient light reflections. Reflected haze has been shown to reduce effective display contrast under external ambient lighting. The display element 100 described herein minimizes or eliminates reflective haze while retaining a significant amount of forward scattering in the buried scattering anti-glare layer 120. This forward scattering should be primarily or entirely into narrow angles of scattering to avoid effectively creating haze (wide-angle scattering) in the light that is reflected from sub-surface display layer(s) 145 and/or adhesive layer(s) 142. Such narrow-angle scattering has little or no effect on the apparent haziness or contrast of displays in ambient lighting. As used herein, "lateral" feature size or spacing refers to measurement of such parameters in the x-y plane; i.e., parallel to the plane of pixels in the display layer(s) 145 and orthogonal to the direction of light transmission from the display layer(s) 145 through the display element 100 to the viewer. As such, lateral feature size is distinguished from "roughness," which is generally measured in the z-direction; i.e., parallel to the direction of light transmission from the display layer(s) 145 through the display element 100 to the viewer.

In some embodiments, the buried scattering anti-glare layer 120 does not include any macroscopic solid-air interfaces. In these embodiments, scattering is generally created by interfaces having either a small or graduated change in refractive index. These small changes in refractive index create new degrees of freedom in the design of anti-glare structures, thus allowing combinations of properties that cannot be achieved with an external (e.g., having at least one macroscopic solid-air interface) interface.

In some embodiments, schematically shown in FIG. 2a, the plurality of scattering elements within the buried scattering anti-glare layer 120 comprises the features of a roughened or undulating surface layer 122 embedded in a matrix material 123 having refractive index $n_1$. The features of the roughened or undulating surface layer 122 may have a periodicity or characteristic dominant lateral spatial periods (equivalent to 1/frequency) in a range from about 5 μm to about 20 μm, an amplitude, and refractive index $n_2$. In the embodiment shown in FIG. 2a, $n_1 < n_2$. In another embodiment, schematically shown in FIG. 2b, the plurality of scattering elements within the buried scattering anti-glare layer 120 comprise a plurality of particles 124 having a selected size, spacing, and refractive index. The plurality of particles 124 are, in some embodiments, embedded in a matrix material 125 having a refractive index that may be equal to or different from that of the plurality of particles 124. Alternatively, the plurality of particles 124 may be disposed on or embedded in a surface of a substrate (not shown). Average or mean period size, average or mean lateral dimension, and average or mean lateral feature size can all be taken as roughly equivalent to one another. In addition to a standard mathematical average, average or mean period size, average or mean lateral dimension, and average or mean lateral feature size may also be defined as a characteristic, dominant, or peak period or feature size, with respect to roughness and/or refractive index variation, that may describe a periodic, random, or semi-random surface or 3-D index profile variation having a continuous spectrum of spatial frequency or period components (sometimes referred to as "power spectral density" in surface roughness profiling), where certain spatial frequencies or periods are the dominant components of the spatial variations. For the purposes of this disclosure, these characteristic, dominant, or peak period or feature size components of the spatial variation may be the same as the "mean" or "average" lateral dimensions, lateral feature sizes, or period sizes, and in some cases this may not match a strict mathematical definition of "mean" or "average".

While the plurality of particles 124 shown in FIG. 2b are spherically symmetric, it will be readily understood that the plurality of particles may assume other shapes such as, for example, hemispheres, pyramids, pillars, elliptical, disk shapes or combinations thereof. In one or more embodiments in which at least some of the plurality of particles 124 are elliptically shaped, the long axis of such particles may be aligned parallel to a major surface of the transparent substrate 130 to create scattering features having a larger lateral spacing and smaller effective roughness. This relationship in which lateral or feature size spacing (in the x-y plane, or parallel to a major surface of the substrate) is greater than roughness (in the z-direction, or orthogonal to a major surface of the substrate) promotes narrow angle scattering.

In other embodiments, the plurality of scattering elements comprises a diffraction grating or other prismatic structure. In still other embodiments, schematically shown in FIG. 2c, the plurality of scattering elements comprise gradient index interfaces in which particles 127 having a refractive index gradient across their cross-section and a core refractive index, are embedded at a predetermined spacing or interval in a matrix 126 having a refractive index that may be different from or equal to that of the core refractive index of particles 127. In some embodiments, the buried scattering anti-glare layer 120 may comprise interfaces and/or rough surfaces having a gradient in refractive index, which may or may not include particles. In some embodiments, the plurality of scattering elements may have a randomized structure for ease of fabrication or to hide defects. In other embodiments (e.g., FIGS. 2b and/or 2c), the refractive index relationships between the plurality of particles 124 and the matrix material 125 may also be reversed. The refractive index relationship between the undulating surface layer 122 embedded in a matrix material 123 shown in FIG. 2a may also be reversed. As shown in FIG. 2d, the plurality of scattering elements 128 may have a prismatic structure and may be embedded at a predetermined spacing or interval in a matrix 129.

Display sparkle is dependent on the lateral size of scattering features, as described in the references cited hereinabove. In some embodiments, the small lateral feature sizes of the plurality of scattering elements enable reduction or elimination of display sparkle without increasing external reflected haze, which may be measured according to ASTM E430. Because reducing the sizes of the plurality of scattering elements on an external surface generally increases reflected haze and reduces display contrast, the above combination of reducing/eliminating sparkle without increasing external reflected haze is generally difficult or impossible to achieve using a conventional external rough surface, which is in contact with air.

The angles of forward scattering of the buried scattering anti-glare layer 120 may also be tailored to achieve an optimal combination of image blurring of light reflected from sub-surface display layer(s) 145 and/or adhesive layer(s) 142 without generating excessive wide-angle scattering of this sub-surface reflected light. If the forward-scattering angles of the buried scattering anti-glare layer 120 are too wide, such wide-angle scattering may be perceived as a reflected haze that reduces contrast. In some embodiments, the forward-scattering in the buried scattering anti-glare layer 120 should not scatter more than 5% of the transmitted light outside an angular cone of about ±45° or, in some embodiments, outside an angular cone of not more than ±20°. In still other embodiments, the forward-scattering in the buried scattering anti-glare layer 120 should not scatter more than 5% of the transmitted light outside an angular cone of not more than ±2.5°, which corresponds to a transmitted haze (which may be measured according to ASTM procedure D1003) created by the buried scattering anti-glare layer 120 of less than about 5%. The reflected haze of the buried scattering anti-glare layer 120 alone should be generally lower (for example, less than 1% or, in some embodiments, less than 0.2%) than the transmitted haze. In some instances, the buried scattering anti-glare layer 120 may have both transmitted and reflected haze of less than about 1% in order to avoid apparent reflected haze from sub-surface display layer(s) 145 and/or adhesive layer(s) 142.

In the display element 100 described herein, reflected and transmitted haze of the buried scattering anti-glare layer 120 can be minimized while simultaneously reducing the size of average or dominant lateral spatial periods (which is equivalent to shifting the spectral size distribution of the plurality of scattering elements to higher frequencies) in the buried scattering anti-glare layer. This reduction in size of the average or dominant lateral spatial periods—which reduces or minimizes display sparkle—may, in some embodiments, be reduced to less than about 50 µm and, in other embodiments, to less than about 15 µm. This physical size reduction of lateral spatial periods offers new degrees of optical design freedom that are not possible to achieve with a conventional single rough scattering surface that is located on an outer surface and adjacent to air. Depending on the specifics of display design and application, however, it may, in some embodiments, be desirable to diffuse the light reflected from the sub-surface display layer(s) 145 over a wider range of angles.

In some embodiments, an AG surface or AR layer or coating may be disposed on front surface 110 above the buried scattering anti-glare layer 120. The buried scattering anti-glare layer 120 may be located or disposed below any external AR coating such that it is between the transparent substrate 130 and the external AR coating. In these instances, the buried scattering anti-glare layer 120 serves to blur the reflected images generated from the sub-surface display layer(s) 145 and/or adhesive layer(s) 142. In order to reduce the display sparkle generated by the conventional AG surface without generating a high reflective haze, the buried scattering anti-glare layer 120 may also be placed below an external rough scattering (i.e., a conventional AG) surface. In such cases, the roughness of the external AG surface could be reduced (for example to less than 200 nm, or even less than 150 nm RMS), thus reducing sparkle while still suppressing external specular reflections from the front of the display element 100. Alternately or additionally, the average or dominant lateral spatial periods of the external AG surface can be made larger than the lateral spatial periods of the buried scattering anti-glare layer, so as to preserve narrow-angle scattering and low haze behavior for the combined system. At the same time, the buried scattering anti-glare layer 120 reduces internal specular reflections from within the display element 100. This enables the AG properties (e.g., sparkle, reflected haze) to be decoupled from the typical behavior of a single air-solid interface, thus enabling combinations of properties (e.g., simultaneous low sparkle, low haze, low distinctness of image (DOI)) that are not possible to achieve with a conventional air-solid external AG surface. In addition, the buried scattering anti-glare layer 120 may, in such embodiments, serve an anti-sparkle function more so than an anti-glare function, as described previously hereinabove.

The distance between the external AR layer or coating and/or AG surface and the buried scattering anti-glare layer 120 is not particularly limited. The buried scattering anti-glare layer 120 may, in some embodiments, be located immediately below the external AG surface and/or AR layer or coating and the front surface 110. Alternatively, the buried scattering anti-glare layer 120 may be located several millimeters below the external AG surface and/or AR layer or coating and front surface 110. In some embodiments, for example, the buried scattering anti-glare layer 120 be placed on the back side of a protective cover glass (such as for example, transparent substrate 130) or adjacent to and inside back surface 140 while the external AG surface and/or AR layer or coating is located on the front surface 110.

To effectively achieve forward scattering of light from sub-surface display layer(s) 145 and/or adhesive layer(s) 142, the buried scattering anti-glare layer 120 may be separated from the sub-surface display layer(s) 145 and/or adhesive layer(s) 142 by at least about 0.1 µm and, in some embodiments, by up to about 5 mm. The maximum separation distance is not particularly limited, and depends on the amount of forward scattering that is designed into the buried scattering anti-glare layer 120. In some embodiments, one or more of the sub-surface display layer(s) 145 and/or adhesive layer(s) 142 may have at least one roughened surface or otherwise include a plurality of scattering elements, thus augmenting or complementing the function of the buried scattering anti-glare layer 120.

The buried scattering anti-glare layer 120, in some embodiments, may comprise a plurality of buried scattering elements such as, but not limited to, particles (FIG. 2b) or an undulating or rough surface (FIG. 2a) that have a small but non-zero refractive index contrast between the scattering element material and an adjacent encapsulating matrix material. The refractive index contrast between the plurality of scattering elements and matrix materials may be small so as not to generate large amounts of reflective scattering. In some embodiments, the buried scattering anti-glare layer 120 does not include air interfaces or air pockets larger than about 0.5 µm, as such pockets and interfaces create high refractive index contrast and increase reflective back-scattering.

Figure 3:
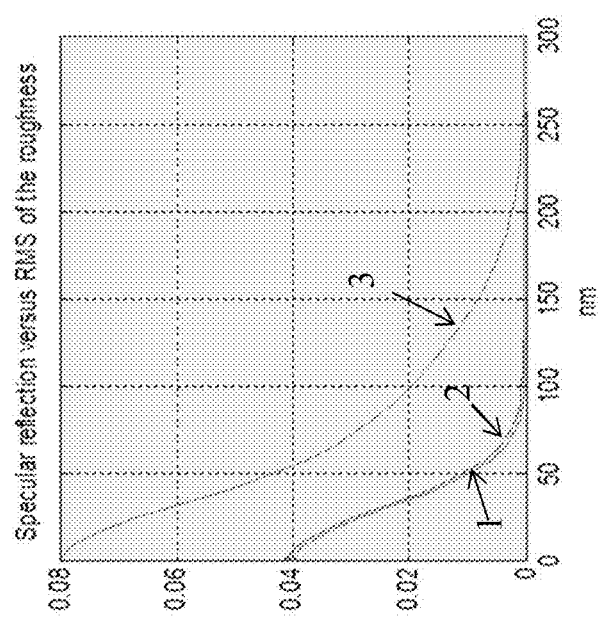
FIG. 3 is a plot of specular reflection for light reflected by the front surface of the display element and light reflected both by the front and the smooth back surfaces versus RMS depth of the simulated roughness on a front surface of the display element.

In those instances where the plurality of scattering elements comprises a roughened or rough surface in optical contact with an encapsulating matrix (e.g., FIG. 2a), the RMS depth of the roughness will have to be substantially larger than that of "conventional" anti-glare treatments applied at the interface with air. In some embodiments, the RMS roughness of the roughened surface is greater than about 50 nm and, in other embodiments, greater than 200 nm. FIG. 3 is a plot of specular reflection versus RMS depth of the roughness on the front surface of a simulated glass plate for light reflected by the front roughened surface only (line 1), and light reflected both by the front roughened surface and the smooth back surfaces (line 3). As seen in FIG. 3, a RMS roughness of 100 nm is sufficient to almost completely eliminate front surface reflection of a glass plate having refractive index $n_g$ of 1.5. The same roughness on the front surface would have to have an RMS depth of at least 200 nm in order to sufficiently "wash out" the reflection from the smooth back surface. For a "buried" surface, (e.g., between a polarizer and adhesive used to bond the cover glass), the required RMS roughness is even larger, and is proportional to the ratio of refractive index contrast in both cases. If, for example, the adhesive is index-matched to the glass ($n_a$=1.5) and the refractive index of the polarizer material is $n_p$=1.6, the reflectivity of the adhesive-polarizer interface will be negligible (only about 0.1%) because the index contrast is small; i.e., $\Delta n$=0.1. The RMS depth of the roughness necessary to "wash out" reflections from other interfaces below the adhesive-polarizer interface will have to be larger than 200·0.5/$\Delta n$, or 200·0.5/0.1=1000 nm, or 1 µm. This provides an approximate lower limit for the size scale of forward scattering elements—such as undulating surfaces or particles—that is needed within the buried scattering anti-glare layer 120 to provide effective forward-scattering AG properties when the refractive index change within the buried scattering anti-glare layer 120 is about 0.1.

The shapes of the plurality of scattering elements in the buried scattering anti-glare layer 120 are not limited, and may include spherical or non-spherical particles, gratings, prisms, sinusoids, hemispheres, cones, pyramids, cubes, cube corners, ellipses, disks, or the like. The allowable interface angles and number of scattering layers within the buried scattering anti-glare layer 120 will be limited by the refractive index contrast between the plurality of scattering elements and the matrix material adjacent to these elements. Shapes with large interface angles such as, for example, spheres, will have a lower allowable index contrast between the plurality of scattering elements and the adjacent matrix. Accordingly, shallow undulations with no high angles in some cases, may be preferred. In some instances, the plurality of scattering elements may include randomized structures in order to better hide defects and for ease of fabrication.

Figure 2C:
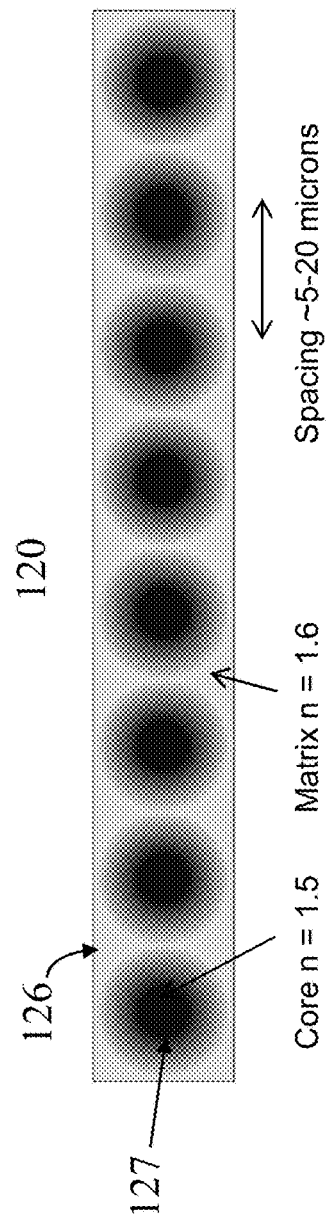
FIG. 2c is a schematic cross-sectional view of a scattering anti-glare layer comprising a plurality of particles embedded in a matrix material and having an index gradient across the thickness of each of the particles.

In one embodiment, the plurality of scattering elements in the buried scattering anti-glare layer 120 comprises interfaces between materials having different refractive indices. In some embodiments, the refractive indices of such materials are in a range from about 1.3 to about 1.7. The buried scattering anti-glare layer 120 may, for example, utilize a refractive index gradient between the plurality of scattering elements and the adjacent matrix material (FIG. 2c). In such embodiments, there are few or no sharp discontinuities in refractive index within the buried scattering anti-glare layer 120. This is an effective method to reduce back-scattering while retaining forward scattering, and relaxes the constraints on refractive index interface angles within the buried scattering anti-glare layer 120. In some embodiments, the refractive index change across such interfaces is non-zero and less than or equal to about 0.4 and, in other embodiments, less than or equal to about 0.2. In some embodiments, the refractive index gradients exhibit a non-zero maximum refractive index change of up to about 0.4 over a gradient distance of at least about 50 nm and, in other embodiments, the refractive index gradients exhibit a non-zero maximum refractive index change of up to about 0.2 over a gradient distance of at least about 1000 nm.

The gradient thickness (t) of the gradient refractive index layer (i.e., the distance over which the index is graded from $n_1$ to $n_2$) must be considered when gradient refractive index at interfaces between the plurality of scattering elements and the adjacent matrix material is employed. In order to reduce reflections at these interfaces, the gradient thickness (t), in terms of number of optical wavelengths L, should generally be at least 0.1 L or larger.

Figure 4:
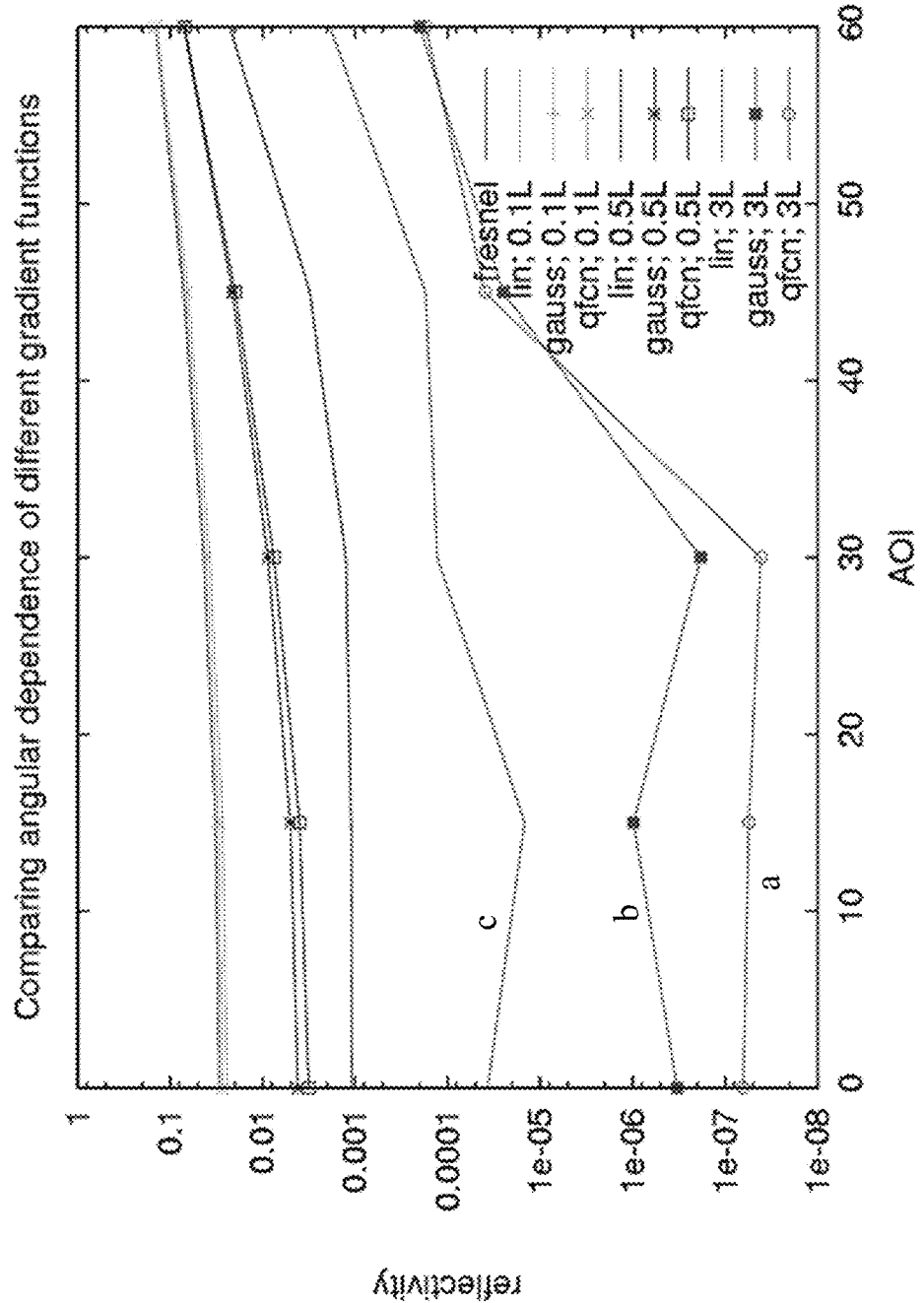
FIG. 4 is a plot of reflectivity at an air-solid gradient index interface for various gradient thicknesses.

FIG. 4 is a plot of reflectivity at an air-solid gradient refractive index interface for various gradient profiles and gradient thicknesses (t), where the refractive index contrast between the air and solid is 0.4. Reflectivity (log scale) is plotted as a function of angle of incidence (AOI) for various gradient index profiles having a refractive index contrast Dn=0.4 in FIG. 4. Lines a, b, and c illustrate that the reflectivity is strongly suppressed over a wide range of interface angles when the gradient thickness t=3 L (3× wavelength) or greater for varying gradient profile shapes.

Because air is included as one of the materials in the stack, FIG. 4 represents a "worst case" scenario. In some embodiments, the buried scattering anti-glare layer 120 should have refractive index contrasts of less than about 0.1 and, in some cases, less than or equal to about 0.02. Nevertheless, FIG. 4 provides a quantitative calculation of the gradient thickness (t) that is needed to substantially eliminate reflections even in the worst case, air-solid interface scenario. As seen in FIG. 4, a refractive index gradient with a gradient thickness t=3 L is effective at suppressing reflections below about R=0.0001 at all angles between 0 and 60 degrees, even for an air-solid interface with refractive index difference Dn=0.4. Since reflectivity generally scales as the square of refractive index difference $Dn^2$, this performance will be dramatically improved by using a system with Dn=0.1 or less, as envisioned for the buried scattering anti-glare layers 120 described herein. If particles with a gradient refractive index at their surface are used as scattering elements, a refractive index gradient thickness t=3 L at the surface of the particles should be more than sufficient to effectively eliminate reflections over a broad angular range, thus allowing the use of random or semi-random scattering elements with a broad range of interface angles between the scattering elements and the adjacent matrix. If particles are used as the scattering elements, the index at the surface of the particles should match the adjacent matrix with the refractive index changing in a gradient manner towards the cores of the particles. In one embodiment, particles have diameters ranging from 5 to 20 µm and a refractive index gradient at their surface with a gradient thickness t=1.5 µm (~3 L).

Due to the greatly reduced reflectivity in a system having Dn=0.1 rather than Dn=0.4, the refractive index gradient thickness (t) can be smaller than 3 L, depending on the specific level of Dn, which, in the gradient case, represents $n_{max}-n_{min}$ for the combination of scattering elements and adjacent matrix. A refractive index gradient thickness of 0.5 L (~300 nm), for example, should be sufficient to suppress back-reflections for many cases, while the laterally varying index profile in the buried scattering anti-glare layer 120 still provides appreciable forward scattering.

Non-limiting methods of fabricating gradient refractive index scattering elements, particles, and/or surfaces, such as those described hereinabove, will now be described. In some embodiments, diffusion of atoms in individual scattering elements may be used to establish a gradient refractive index in either an undulating or roughened surface (FIG. 2*a*) or particles (FIG. 2*b*). A gradient refractive index may be created at the surface of transparent glass or polymer particles by placing the particles in a medium (typically a gas or liquid) that is rich in atoms that diffuse into the particles or promote outward diffusion of atoms within the particle. This diffusion modifies the refractive index at the particle surface and creates a refractive index gradient—which is determined by the diffusion rate of the atoms—towards the core of the particle. In one non-limiting example, alkali-containing glass beads may be placed in a molten $KNO_3$ salt bath containing a controlled or predetermined amount of $AgNO_3$. The $Ag^+$ and $K^+$ ions can diffuse into the glass beads to replace $Na^+$ or $K^+$ within the glass and increase the refractive index at the surface of the particles. A similar ion exchange process may be used to create a refractive index gradient in an undulating or roughened surface.

In other embodiments, nano-porosity may be introduced into scattering elements such as particles, undulating or roughened surfaces, or the like by various means. For example, a liquid suspension or solution containing monomers or polymers such as a siloxane, polyimide, silsesquioxane, sol-gel materials, or the like may be dissolved in the solution, which may comprise a block copolymer surfactant such as, for example, BASF Pluronic® P103, P123, F68, or the like, that forms molecular micelles in solution. The solution may then be cast into a rough surface or otherwise formed into particles and dried, leaving behind a solid matrix of polymer filled with nano-scale domains of block copolymer. The block copolymer may then be removed using controlled heating or solvent rinsing, leaving behind a nano-porous surface that lowers the effective refractive index of that surface without optical scattering because the pores are typically 10 nm or smaller. The controlled heating or solvent rinsing can be done in such a way such that the block copolymer is only removed from the near-surface region of the particles or layer and thus creates the refractive index gradient.

In some embodiments, the refractive index of glasses and polymers may be modified by exposure to laser or UV radiation. Such methods may be used to create a gradient index diffuser, structure, or grating within a substrate. One example of this is the technique used to create "fiber Bragg gratings" in optical fiber. Multi-photon illumination techniques may also be used to create complex 3-dimensional, varying refractive index profiles in glasses or polymers.

In some embodiments, the refractive index of glasses or polymers may be modified by surface leaching, dissolution, swelling, or related methods that may use a solvent, an acid, or a base to modify the composition or density of the surface layers. For example, an alkali aluminosilicate glass can be leached using HCl, $HNO_3$, other acids, or basic solutions to create a low-index nanoporous, gel, or "skeletal" surface layer, which has a lower refractive index that the bulk of the glass due to its structure (see, for example, Hamilton and Pantano, "Effects of Glass Structure on the Corrosion Behavior of Sodium-Aluminosilicate Glasses", Journal of Non-Crystalline Solids, 1997). This low-index surface can have a gradient in refractive index between the surface and the bulk of the glass. Such treatments could be applied to glass surfaces or to glass particles in the various geometries described herein.

In some embodiments, a gradient refractive index effect may be created by sequentially depositing multiple layers of varying refractive index on a surface. In one such embodiment, a roughened (AG) surface for placement on a back side of a cover glass (e.g., display element 100 and/or transparent substrate 130) is created. Lateral spatial frequencies of the surface are controlled in order to minimize sparkle; i.e., average or dominant lateral spatial periods should be less than 50 µm or, in some embodiments, less than 15 µm. The average roughness of the roughened surface may be in the range from about 0.5 µm to about 2 µm, as described hereinabove, to effectively "wash out" buried specular reflections.

In some embodiments, a series of 5-10 nm thick layers are deposited on top of a rough surface of a transparent substrate 130 comprising a glass substrate. The refractive index of the initial layers (i.e., adjacent or closer to the surface) should be very close to the index of the glass (e.g., 1.51). For example, the first layer deposited on the glass may be 10 nm thick and have a refractive index of 1.51, the second layer may be 10 nm thick and have refractive index 1.515, the third layer may be 10 nm thick and have a refractive index of 1.52, etc. This sequence may be continued up to a final layer having a refractive index of, for example, 1.56 or 1.6.

Different methods of optimizing individual layer thicknesses and refractive index changes from one layer to the next are available. Smaller changes in refractive index and more layers than those previously described may provide better (i.e., lower reflection) performance, but at added cost. The layers may be deposited using those methods known in the art. For example, co-deposition of $TiO_2$—$SiO_2$ blends, $Nb_2O_5$—$SiO_2$ blends, $Ta_2O_5$—$SiO_2$ blends, $GeO_2$—$SiO_2$ blends, or the like may be deposited using e-beam evaporation, sputtering, or chemical vapor deposition (CVD) methods. Similarly, varying multilayer refractive index blends can be created using sol-gel methods in which layers are sequentially deposited by spin coating, dip coating, spray coating, or the like. The resulting layers should be semi-conformal to the rough surface of the transparent glass substrate 130.

The completed graded refractive index multilayer structure having, for example, a terminal index of 1.6 will then have an adhesive with a matching refractive index of about 1.6 bonded to the coated rough surface of a glass substrate and used as part of the mounting assembly in a display device, with the coated rough surface being on the back (i.e., distal from the viewer) side or back surface 140 (FIG. 1) of a display element. The display element may have a separate AR or AG treatment (or combined AR+AG) on the front (viewer) side or front surface 110 (FIG. 1), as previously described hereinabove.

In some embodiments, a gradient refractive index structure is not required. A buried scattering anti-glare layer 120 may, for example, be formed from particles or surfaces surrounded by an encapsulating matrix (FIG. 2*b*). The difference in refractive index between the scattering elements/particles is not gradual, but abrupt; e.g., a refractive index change from $n_1$ to $n_2$ may be present over a distance of less than 20 nm. In certain embodiments, this refractive index change may be small—for example, less than 0.3 and, in some embodiments, less than 0.1.

The plurality of scattering elements and/or undulating layers comprising the buried scattering anti-glare layer 120 may be formed by those means known in the art such as, but not limited to, embossing, etching, micro-replication, slot coating, roll coating, gravure coating, spray coating, inkjet printing, surface crystallization, phase separation, or the like. These scattering elements may be brought into optical contact with an encapsulating medium or adhesive layer using those methods described hereinabove or similar methods.

The transparent substrate 130 may be either a plastic or glass substrate. Non-limiting examples of plastic substrates include polymethyl methacrylate, polyethylene terephthalate, polyethylene naphthalate, polycarbonate, or the like. In some embodiments, the transparent substrate is or comprises a borosilicate glass, an aluminoborosilicate glass, or an alkali aluminosilicate glass. In some embodiments, the glasses described hereinabove are down-drawable by processes known in the art, such as slot-drawing, fusion drawing, re-drawing, and the like, and has, in some embodiments, a liquidus viscosity of at least 130 kilopoise.

In some embodiments, the transparent glass substrate contains at least 2 mol % of $Al_2O_3$ and/or $ZrO_2$ and, in some embodiments, comprises or consists of an alkali aluminosilicate glass comprising: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)−$Al_2O_3$≥2 mol %; 2 mol %≤$Na_2O$−$Al_2O_3$≤6 mol %; and 4 mol %≤($Na_2O$+$K_2O$)−$Al_2O_3$≤10 mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In other embodiments, the transparent glass substrate comprises or consists of an alkali aluminosilicate glass comprising: at least one of alumina and boron oxide, and at least one of an alkali metal oxide and an alkali earth metal oxide, wherein −15 mol %≤($R_2O$+R'O−$Al_2O_3$−$ZrO_2$)−$B_2O_3$≤4 mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. patent application Ser. No. 12/277,573 by Matthew J. Dejneka et al., entitled "Glasses Having Improved Toughness and Scratch Resistance," filed Nov. 25, 2008, and claiming priority to U.S. Provisional Patent Application No. 61/004,677, filed on Nov. 29, 2008, the contents of which are incorporated herein by reference in their entirety.

In still other embodiments, the transparent glass substrate comprises or consists of an alkali aluminosilicate glass comprising: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. The glass is described in U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008, the contents of which are incorporated herein by reference in their entirety.

In other embodiments, the transparent glass substrate comprises or consists of an alkali aluminosilicate glass comprising $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In other embodiments, the transparent glass substrate comprises or consists of an alkali aluminosilicate glass comprising at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In other embodiments, the transparent glass substrate comprises or consists of an alkali aluminosilicate glass comprising $SiO_2$, $Al_2O_3$, $P_2O_5$, and at least one alkali metal oxide ($R_2O$), wherein 0.75≤[($P_2O_5$(mol %)+$R_2O$(mol %))/$M_2O_3$ (mol %)]≤1.2, where $M_2O_3$=$Al_2O_3$+$B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the transparent glass substrate comprises or consists of an alkali aluminosilicate glass comprising at least about 4 mol % $P_2O_5$, wherein ($M_2O_3$ (mol %)/$R_xO$(mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. Provisional Patent Application No. 61/560,434 by Timothy M. Gross, entitled "Ion Exchangeable Glass with High Crack Initiation Threshold," filed Nov. 16, 2011, the contents of which are incorporated herein by reference in their entirety.

In still other embodiments, the transparent glass substrate comprises or consists of an alkali aluminosilicate glass comprising at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1\cdot Al_2O_3-28.7\cdot B_2O_3+15.6\cdot Na_2O-61.4\cdot K_2O+8.1\cdot(MgO+ZnO)\geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. Provisional Patent Application No. 61/503,734 by Matthew J. Dejneka et al., entitled "Ion Exchangeable Glass with High Compressive Stress," filed Jul. 1, 2011, the contents of which are incorporated herein by reference in their entirety.

In some embodiments, the glass substrates described hereinabove are substantially free of (i.e., contain 0 mol % of) of at least one of lithium, boron, barium, strontium, bismuth, antimony, and arsenic.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A display element, the display element comprising:
a) a front surface;
b) a back surface;
c) a scattering anti-glare layer disposed between the front surface and the back surface, the scattering anti-glare layer being transparent and comprising a plurality of scattering elements; and
d) a transparent substrate disposed between the front surface and the back surface,
wherein the scattering anti-glare layer comprises one of a diffraction grating and a prismatic structure and wherein less than 2% of light transmitted through the display element is scattered outside of 5 degrees from the angle of incidence.

2. The display element of claim 1, wherein the front surface is one of an antiglare surface, an antireflective surface, or combinations thereof.

3. The display element of claim 1, wherein the plurality of scattering elements has a mean lateral feature size of less than about 50 μm.

4. The display element of claim 1, wherein the scattering anti-glare layer is disposed between the front surface and the transparent substrate.

5. The display element of claim 1, wherein the scattering anti-glare layer is disposed between the transparent substrate and the back surface.

6. The display element of claim 1, wherein the scattering anti-glare layer has less than about 2% total reflectance.

7. The display element of claim 1, wherein the scattering anti-glare layer comprises a roughened surface, the roughened surface having a RMS roughness of greater than 50 nm.

8. The display element of claim 7, wherein the roughened surface has a RMS roughness of greater than 200 nm.

9. The display element of claim 1, wherein the display element has a transmitted haze of less than about 5%.

10. The display element of claim 1, wherein the display element has a reflected haze of less than about 1%.

11. The display element of claim 1, further comprising a polarizer filter disposed between the back surface and the front surface.

12. The display element of claim 1, further comprising a display layer disposed on the back surface, the display layer comprising a touch sensing layer, a LCD display, a LED display, an OLED display, or combinations thereof.

13. The display element of claim 1, wherein at least one of the transparent substrate and the scattering anti-glare layer comprises an alkali aluminosilicate glass.

14. The display element of claim 13, wherein the alkali aluminosilicate glass is ion exchanged.

15. The display element of claim 1, wherein the display element has a thickness of up to about 3 mm.

16. The display element of claim 1, wherein the scattering anti-glare layer has a thickness of less than about 0.1 mm.

17. The display element of claim 1, wherein the scattering anti-glare layer is separated from the back surface by a distance in a range from about 0.1 to about 2 mm.

18. The display element of claim 1, wherein the scattering anti-glare layer and the display are separated by a distance of less than about 2 mm.

19. A buried scattering anti-glare layer for a display element, the buried scattering anti-glare layer being transparent and capable of being disposed between a front surface and a back surface of the display element, the buried scattering anti-glare layer comprising a plurality of scattering elements having an average lateral dimension of less than about 50 μm, wherein the buried scattering anti-glare layer has less than about 2% total reflectance and less than 5% of light transmitted through the buried scattering anti-glare layer is scattered outside of about 5 degrees from an angle of incidence of the transmitted light.

20. The buried scattering anti-glare layer of claim 19, wherein the buried scattering anti-glare layer comprises a roughened surface, the roughened surface having a RMS roughness of at least about 50 nm.

21. The buried scattering anti-glare layer of claim 19, wherein the plurality of scattering elements comprises a plurality of particles disposed on a surface of a substrate.

22. The buried scattering anti-glare layer of claim 21, wherein the plurality of particles is embedded in a matrix disposed on the substrate.

23. The buried scattering anti-glare layer of claim 21, wherein the plurality of particles are embedded in the surface of the substrate.

24. The buried scattering anti-glare layer of claim 19, wherein the plurality of scattering elements comprises a diffraction grating or prismatic structure.

25. The buried scattering anti-glare layer of claim 19, wherein the buried scattering anti-glare layer comprises an alkali aluminosilicate glass.

26. The buried scattering anti-glare layer of claim 19, wherein the buried scattering anti-glare layer has a transmitted haze of less than about 5%.

27. The buried scattering anti-glare layer of claim 19, wherein the buried scattering anti-glare layer has a reflected haze of less than about 1%.

28. The buried scattering anti-glare layer of claim 19, wherein the plurality of scattering elements have an average feature size in a lateral direction in a range from about 5 μm to about 20 μm and an average feature size in a direction parallel to light transmitted through the buried scattering anti-glare layer in a range from about 0.1 μm to about 5 μm.

29. The buried scattering anti-glare layer of claim 19, wherein the buried scattering anti-glare layer comprises at least one interface between materials of varying refractive index, and wherein the scattering layer has a maximum refractive index change across the at least one interface of up to about 0.2.

30. The buried scattering anti-glare layer of claim 19, wherein the buried scattering anti-glare layer comprises at least one material of varying refractive index and having a refractive index gradient, the refractive index gradient having a non-zero maximum refractive index change of up to about 0.4 over a gradient distance of at least about 50 nanometers.

31. The buried scattering anti-glare layer of claim 19, wherein the buried scattering anti-glare layer comprises at least one material of varying refractive index and having a refractive index gradient, the refractive index gradient having a non-zero maximum refractive index change of up to about 0.2 over a gradient distance of at least about 1000 nanometers.

32. A display element, the display element comprising:
   a) a front surface, the front surface comprising at least one of an antiglare surface, an antireflective surface, or a combination thereof;
   b) a back surface;
   c) a buried scattering anti-glare layer disposed between the front surface and the back surface, the buried scattering anti-glare layer being transparent and comprising a plurality of scattering elements, the plurality of scattering elements having an average lateral dimension of less than about 50 μm, wherein the buried scattering anti-glare layer has less than about 2% total reflectance, and wherein less than 5% of light transmitted through the buried scattering anti-glare layer is scattered outside of about 5 degrees from an angle of incidence of the transmitted light; and
   d) a transparent substrate disposed between the front surface and the back surface.

33. The display element of claim 32, wherein the front surface comprises an anti-glare surface having a non-zero RMS average roughness of less than about 200 nanometers.

* * * * *